(12) United States Patent
Mountain

(10) Patent No.: US 8,704,948 B2
(45) Date of Patent: Apr. 22, 2014

(54) APPARATUS, SYSTEMS AND METHODS FOR PRESENTING TEXT IDENTIFIED IN A VIDEO IMAGE

(75) Inventor: Dale Mountain, Silsden (GB)

(73) Assignee: Eldon Technology Limited, Keighley (GB)

( * ) Notice: Subject to any disclaimer, the term of this patent is extended or adjusted under 35 U.S.C. 154(b) by 154 days.

(21) Appl. No.: 13/353,160

(22) Filed: Jan. 18, 2012

(65) Prior Publication Data
US 2013/0182182 A1 Jul. 18, 2013

(51) Int. Cl.
*H04N 5/445* (2011.01)
*G06T 5/00* (2006.01)
*G06F 17/28* (2006.01)

(52) U.S. Cl.
USPC ............................. 348/564; 382/176; 704/7

(58) Field of Classification Search
USPC ............ 348/553, 569, 564, 734, 62, 63, 576; 345/672; 704/2, 3, 8, 9, 276, 7, 277, 704/260
See application file for complete search history.

(56) References Cited

U.S. PATENT DOCUMENTS

| | | | |
|---|---|---|---|
| 6,608,930 B1* | 8/2003 | Agnihotri et al. | 382/176 |
| 7,456,902 B2* | 11/2008 | Kikinis | 348/473 |
| 7,689,613 B2* | 3/2010 | Candelore | 707/707 |
| 8,130,320 B2* | 3/2012 | Kikinis | 348/473 |
| 2002/0159636 A1* | 10/2002 | Lienhart et al. | 382/176 |
| 2003/0216922 A1* | 11/2003 | Gonzales et al. | 704/260 |
| 2006/0170824 A1* | 8/2006 | Johnson et al. | 348/569 |
| 2010/0265535 A1* | 10/2010 | Friedman et al. | 358/1.15 |
| 2011/0043644 A1* | 2/2011 | Munger et al. | 348/207.1 |
| 2012/0088543 A1* | 4/2012 | Lindner et al. | 455/556.1 |
| 2013/0033521 A1* | 2/2013 | Karasin et al. | 345/619 |

* cited by examiner

*Primary Examiner* — Victor Kostak
(74) *Attorney, Agent, or Firm* — Lowe Graham Jones PLLC

(57) ABSTRACT

Systems and methods are operable to present text identified in a presented video image of a media content event. An exemplary embodiment receives a complete video frame that is associated with a presented video image of a video content event, wherein the presented video image includes a region of text; finds the text in the complete video frame; uses an optical character recognition (OCR) algorithm to translate the found text; and presents the translated text. The translated text may be presented on a display concurrently with the video image that is presented on the display. Alternatively, or additionally, the translated text may be presented as audible speech emitted from at least one speaker.

20 Claims, 5 Drawing Sheets

APPARATUS, SYSTEMS AND METHODS FOR PRESENTING TEXT IDENTIFIED IN A VIDEO IMAGE

BACKGROUND

Media devices, such as a set top box, a stereo, a television, a computer system, a game system, or the like, are often configured to present a media content event to a user. The media content event includes video content that is presented on a display and includes synchronized audio content that is presented as sounds emitted from speakers or the like. At various times, portions of the presented video content may show an image of text on objects which were included during the filming of a currently presented scene of the media content event. For example, a street sign may be shown in a presented scene of a movie or television show. As another example, a letter, an open book, or a computer screen may show text.

The presented text of the filmed objects may be relevant to the theme of the media content event. That is, the presented text may be significant for the user to read and understand so as to better appreciate the theme of a currently presented scene. Alternatively, or additionally, the text may provide information that the user may be curious about, such as a license plate on an image of an automobile that would indicate a location of the filmed scene.

However, due to various factors, the user may not be able to readily perceive the presented text. For example, the presentation time of the text may be too short for the user to become aware of, read, and then comprehend. As another example, the display upon which the media content event is presented on may be relatively small such that the presented text is not easily readable. In some situations, the user may be seated at a relatively far distance from the display such that such that the presented text is not easily readable. As yet another example, the user may have some degree of visual impairment such that it is relatively difficult for the user to read the presented text.

Accordingly, there is a need in the arts to facilitate presentation of text in a manner that facilitates comprehension of the presented text by the user.

SUMMARY

Systems and methods of presenting text identified in a presented video image of a media content event are disclosed. An exemplary embodiment receives a complete video frame that is associated with a presented video image of a video content event, wherein the presented video image includes a region of text; finds the text in the complete video frame; uses an optical character recognition (OCR) algorithm to translate the found text; and presents the translated text. The translated text may be presented on a display concurrently with the video image that is presented on the display. Alternatively, or additionally, the translated text may be presented as audible speech emitted from at least one speaker.

BRIEF DESCRIPTION OF THE DRAWINGS

Preferred and alternative embodiments are described in detail below with reference to the following drawings.

DETAILED DESCRIPTION

Figure 1:
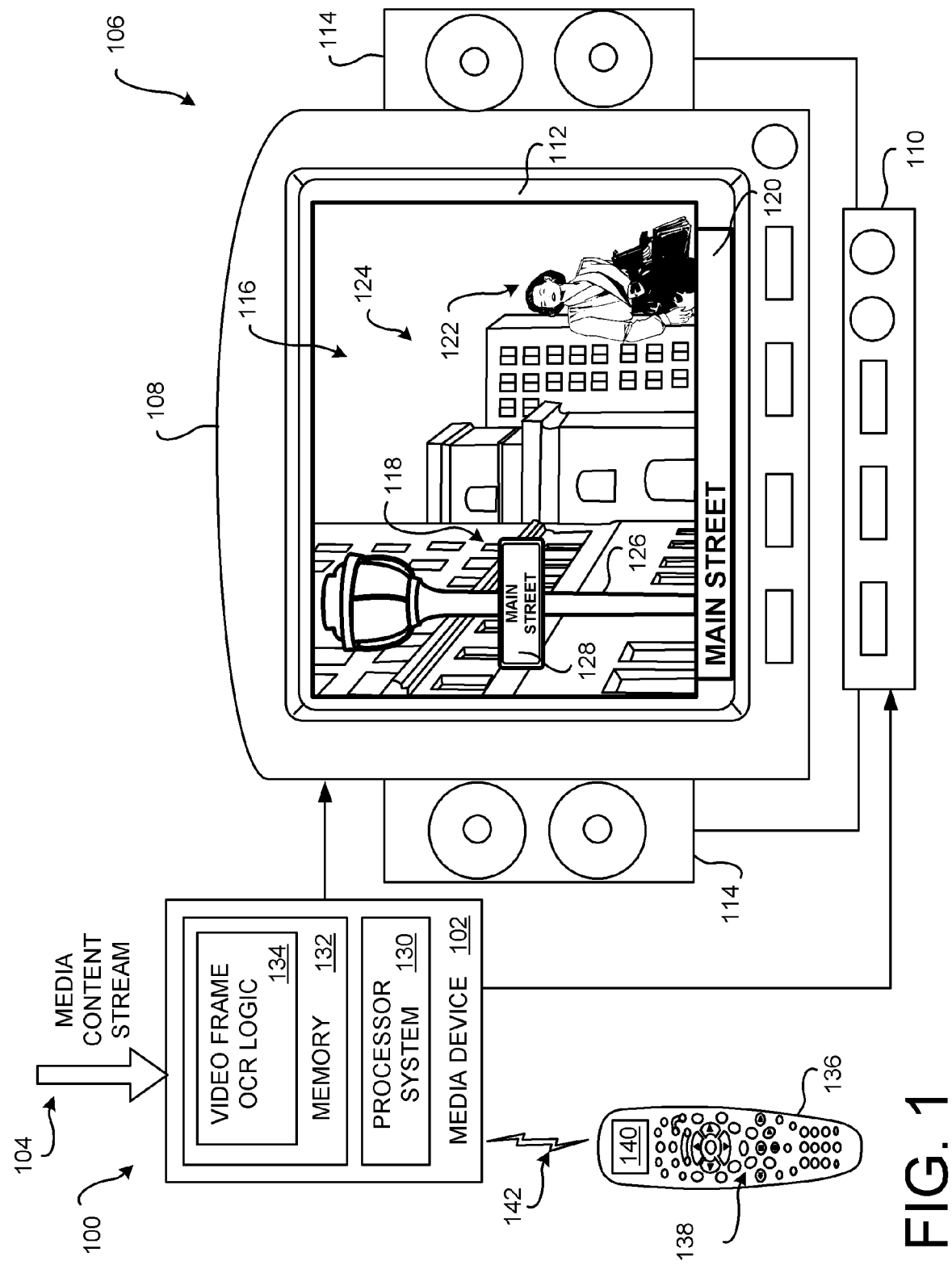
FIG. 1 is a block diagram of an embodiment of a video text recognition system implemented in a media device.

FIG. 1 is a block diagram of an embodiment of a video text recognition system 100 implemented in a media device 102, such as, but not limited to, a set top box (STB). Embodiments of the video text recognition system 100 may be implemented in other media devices, such as, but not limited to, a television (TV), a digital video disc (DVD) player, a digital video recorder (DVR), a game playing device, or a personal computer (PC) that is configured to process video-based media content.

A media content stream 304 is received at the media device 102. The received media content stream 304 may comprise one or more streaming types of video-based media content events. Exemplary programs may include movies, made-for-television program series, newscasts, local programming, and/or special events. A user (not shown) is able to cause the media device 102 to process a selected video-based media content event.

The exemplary media device 102 is communicatively coupled to a media presentation system 106 that includes a visual display device 108, such as a television (hereafter, generically a TV), and an audio presentation device 110, such as a surround sound receiver controlling an audio reproduction device (hereafter, generically, a speaker). Other types of output devices may also be coupled to the media device 102, including those providing any sort of stimuli sensible by a human being, such as temperature, vibration and the like. The video portion of the media content event is displayed on the display 112 and the audio portion of the media content event is reproduced as sounds by one or more speakers 114. In some embodiments, the media device 102 and one or more of the components of the media presentation system 106 may be integrated into a single electronic device.

The processed video-based media content event is presented as a sequential series of video frames on the display 112, wherein each video frame is presented for a brief duration, and then is followed by presentation of the next video frame. As time progresses, a user viewing the display 112 perceives a moving picture. From time to time, one of the presented video frames may include an image portion 118 of the presented video image 116 having visible text thereon.

Embodiments of the video text recognition system 100 find, in a presented video frame, the presented text of the image portion 118. Then, the found text is translated into text information that is presented to the user. For example, an optical character resolution (OCR) algorithm may be used to operate the media device so as to cause the media device 102 to find text in the video image 116, and then to translate the text into printed text corresponding to the text found in the video image 116. In a non-limiting embodiment, the translated text may be presented on a text banner 120 that may be shown at a convenient location on the display 112. The presented translated text is relatively large and easily perceivable by the user.

Alternatively, or additionally, a voice synthesis algorithm may be used that operates the speakers 114 to reproduce the translated text as audible language. The presented audio language corresponding to the translated text is relatively loud and easily perceivable by the user.

A video frame as used herein is a single captured image of a scene of a video-based media content event that is captured by a video camera or other image capture type device. That is, the video image 116 presents an image of the scene captured by the video camera or the other image capture device. Accordingly, the presented video image includes a region of text that has been captured in the scene. Thus, the text that is translated is on an object that is part of the captured scene. In contrast, other text based information may be added to the captured scene. This supplemental text is different from the text that is translated be the various embodiments of the video text recognition system 100. However, some embodiments may be configured to detect and translate such supplemental text.

A simplified example of a presented video image 116 is shown on the display 112 of the television 108. The presented video image 116 presents a scene of a media content event. The scene shows a woman 122 and a downtown city view 124 of a plurality of buildings in the background. An image of a lamp post 126 is presented in the foreground of the video image 116. A street sign 128 with the text "Main Street" thereon is affixed to the lamp post 126. The woman 122 is apparently gazing at the street sign 128. The name of the street, Main Street, is likely relevant to the theme of the presented scene.

The presented text "Main Street" appears as a series of discernable symbols or objects shown in the presented image. For example, the letter "M" is discernable as an object represented by two vertical lines separated by two opposing slanting lines. The video frame OCR logic 134 is configured to analyze various symbols or objects in the video image 116, and when a symbol or object is identified that corresponds to a letter, the video frame OCR logic 134 translates the symbol or object into the corresponding letter. For example, when the video frame OCR logic 134 recognizes the object on the street sign 128 that corresponds to two vertical lines separated by two opposing slanting lines, the symbol or object is translated into the letter "M" by the video frame OCR logic 134. Accordingly, text is found in the video image 116, and then is translated into a corresponding text string.

The exemplary media device 102 includes a processor system 130 and a memory 132. Video frame OCR logic 134 resides on the memory 132. The media device 102, executing the video frame OCR logic 134, finds the text "Main Street" in the video frame presented in the image portion 118 of the video image 116. The found text "Main Street" is translated into the translated text, which is then presented in the banner 120. Accordingly, if the user is not readily able to discern the text of the street sign 128, the user will alternatively be able to discern the translated text "Main Street" presented in the banner 120.

The exemplary media device 102 is configured to receive commands from the user via an optional remote control 136. The remote control 136 includes one or more controllers 138 and an optional display 140 residing on the surface of the remote control 136. The user, by actuating one or more of the controllers 138, or icons presented on the display 140 when configured as a touch sensitive type display, causes the remote control 136 to generate and transmit commands, via a wireless signal 142, to the media device 102.

For example, but not limited to, the commands generated by the remote control 136 may control various operating modes of the media device 102. Such modes of operation are referred to herein as a text translation mode of operation of the media device 102.

In an example embodiment, the video text recognition system 100 may be activated or deactivated by the user. When the user is relatively close to the TV 108, the user may be able to discern the text on the street sign 128, and therefore may choose to deactivate operation of the video text recognition system 100. At other times, the user may be relatively far away from the TV 108, and/or the TV may have a relatively small display 112. Accordingly, the user may activate the video text recognition system 100 such that text found in the presented video image 116 is translated and displayed. In some embodiments, the translated text may be presented on the display 140 of the remote control 136.

Figure 2:
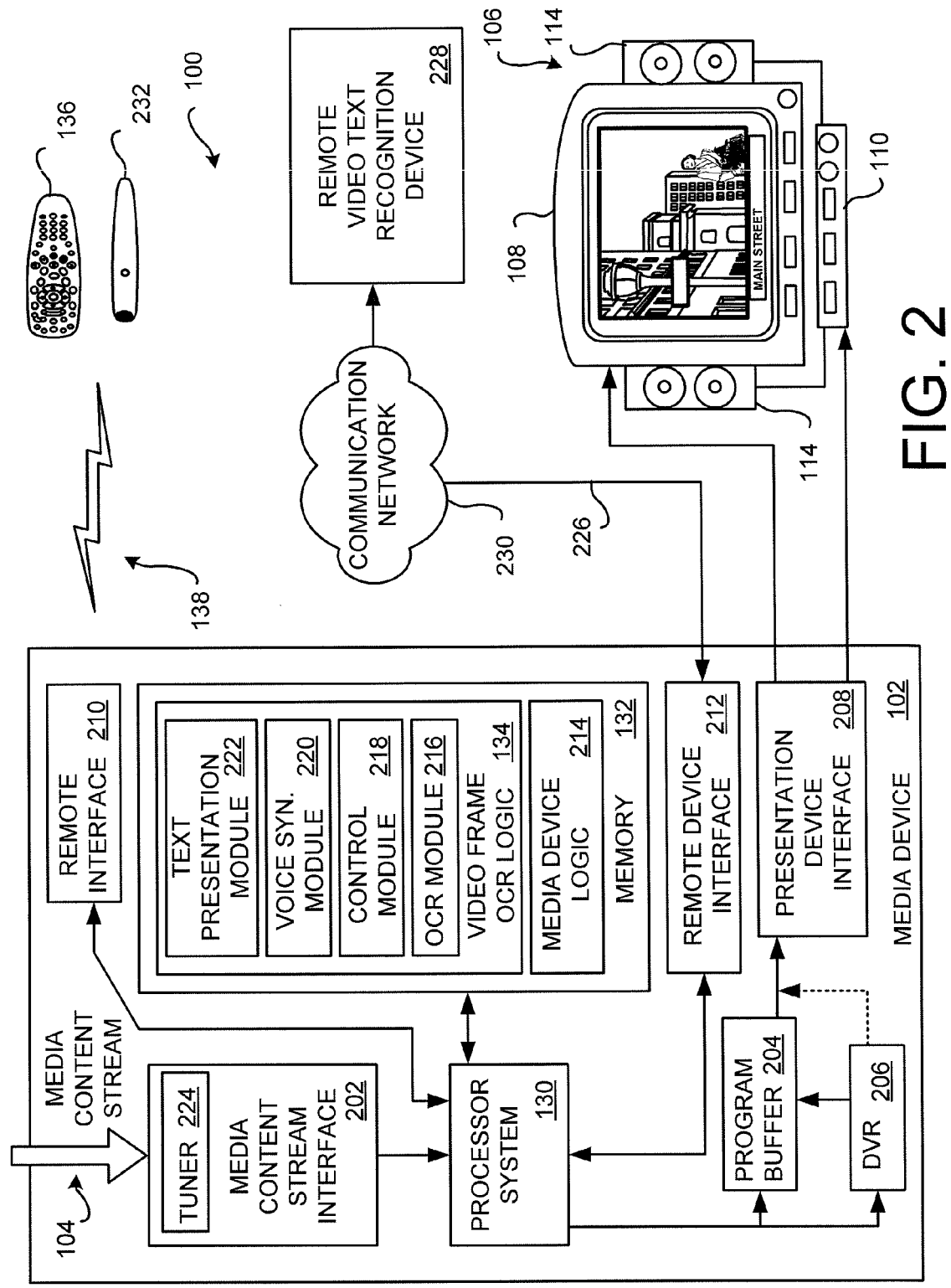
FIG. 2 is a block diagram of an embodiment of an example media device.

FIG. 2 is a block diagram of an example media device 102 provisioned with an embodiment of the video text recognition system 100. The non-limiting exemplary media device 102 comprises a media content stream interface 202, the processor system 130, the memory 132, a program buffer 204, an optional digital video recorder (DVR) 206, a presentation device interface 208, a remote interface 210, and an optional remote device interface 212. The memory 132 comprises portions for storing the media device logic 214 and the video frame OCR logic 134. The non-limiting example video frame OCR logic 134 comprises an optical character resolution (OCR) module 216, a control module 218, a voice synthesis (syn.) module, and a text presentation module 222. In some embodiments, the video processing logic 214, the video frame OCR logic 134, and/or one or more of the modules 216-222, may be integrated together, and/or may be integrated with other logic and/or modules. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 304 can be received from one or more different sources, such as, but not limited to, a cable system, a radio frequency (RF) communication system, or the Internet.

The one or more media content streams 104 are received by the media content stream interface 202. One or more tuners 224 in the media content stream interface 202 selectively tune to one of the media content streams 104 in accordance with instructions received from the processor system 130. The processor system 130, executing the media device logic 214 and based upon a request for a media content event of interest specified by a user, parses out media content associated with the media content event of interest. The media content event of interest is then assembled into a stream of video and/or audio information which may be stored by the program buffer 204 such that the media content can be streamed out to components of the media presentation system 106, such as the visual display device (TV) 108 and/or the audio presentation device 110, via the presentation device interface 208. Alternatively, or additionally, the parsed out media content may be saved into the DVR 206 for later presentation. The DVR 206 may be directly provided in, locally connected to, or remotely connected to, the media device 102.

The processes performed by the media device 102 relating to the processing of the received media content stream 304 and communication of a presentable media content event to the components of the media presentation system 106 are generally implemented by the processor system 130 while executing the media device logic 214. Thus, the media device 102 may perform a variety of functions related to the processing and presentation of one or more media content events received in the media content stream 304.

The optional remote device interface 212 is configured to establish a backchannel communication link 226 between the media device 102 and a remote video text recognition device 228, via a communication network 230. The backchannel is a two-way communication link that communicatively couples the media device 102 and the remote video text recognition device 228. Communication over the backchannel is established over a physical path and/or a logical path, referred to herein as the backchannel communication link 226. Once the backchannel is established between the media device 102 and the remote video text recognition device 228, one or more video frames with portions having text of interest thereon may be communicated from the media device 102 to the remote video text recognition device 228. The remote video text recognition device 228 may then find, and then translate the text shown on the transmitted video frame. The remote video text recognition device 228 then provides the media device information, such as the translated text, to the media device so that the media device 102 can present the translated text using components of the media presentation system 106. Such embodiments may be implemented in media devices 102 that do not have the video frame OCR logic 134.

The communication network 230 is illustrated as a generic communication system. In one embodiment, the communication network 230 comprises the Internet. Accordingly, the remote device interface 212 is a modem or other type of Internet communication device. Alternatively, the communication network 230 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, the remote device interface 212 is configured to establish a communication link or the like with the communication network 230 on an as-needed basis, and is configured to communicate over the particular type of communication network 230 that it is coupled to.

Some embodiments may be configured to receive information from a another type of remote device 232 which emits commands and/or information in a wireless signal that is detectable by the remote interface 210 (or another interface, not shown). In one embodiment, the remote device 232 is a laser-based pointer device that emits a laser beam or the like. Movement and/or orientation of the output laser beam is detectable at the media device 102 and/or at another device (not shown). When the user points the remote device 232 towards the display 112 and orients the output laser beam to a particular point or area on the display 112, and in response to the user actuating one or more of the actuators 234 on the remote device 234, the media device 102 identifies the image portion 118 on the video image 116 that is presenting text that the user is interested in learning about. In an example embodiment, a path of the laser beam over the presented video image 116 identifies the location, size and/or shape of the text search region. Based on this user input, the text in the image portion 118 is found, translated, then presented as printed text to the user on the display and/or as output as audible language from the speakers 114.

As another example, various commercially available game systems employ wand-like remote devices or other pointer devices that are used during game play. Some games employ joy stick-type controllers that are communicatively coupled to the media device 102 using a wire-based connector or a wireless medium. The user may use such controllers to navigate a pointer or icon that is presented on the display 112 to, or in proximity to, a particular point or area on the display 112 that is presenting text that the user is interested in learning about. Embodiments of the video text recognition system 100 may be configured to recognize output from these other types of remote devices 232.

In some applications, the display 112 may itself be sensitive to the wireless signal 142 emitted by the remote control 136 and/or the remote device 232. In such embodiments, the media presentation device 108 then communicates information back to the media device indicating the particular point or area on the display 112 that is presenting text that the user is interested in learning about. The media device 102 and/or the remote video text recognition device 228 may then analyze the corresponding video frame information to find and translate the text of interest.

Figure 3:
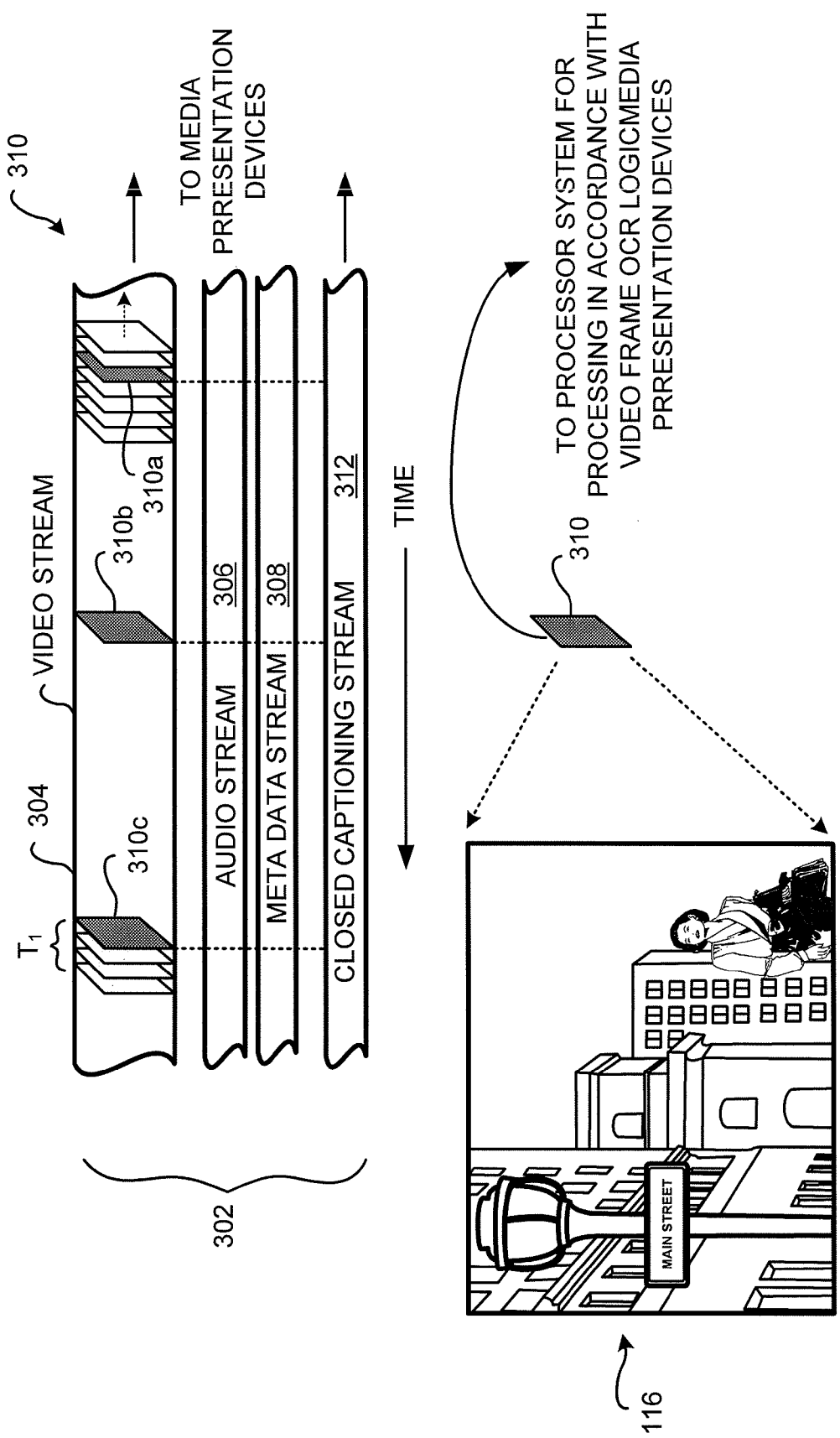
FIG. 3 conceptually illustrates a portion of a streaming media content event of interest residing in a received media content stream.

FIG. 3 conceptually illustrates a portion 302 of a streaming media content event of interest residing in a received media content stream 304. The portion 302 of the streaming media content event includes a video stream 304, a corresponding audio stream 306, and a corresponding metadata stream 308. The video stream 304 is comprised of a plurality of serially sequenced video frames 310, each having information this is used to generate a particular image of a media content event. The video frames 310 are serially presented so as to create a moving picture. The audio stream 306 may include spoken words, music, and background sounds. The audio stream 306 is sequenced with the video frames 310 such that spoken words, music, and background sounds of the audio stream 306 correspond in time with the moving picture. Some program streams 102 may include a metadata stream 308 which contains other information of interest, such as information describing characteristics of the scene of the corresponding video frame 310.

A closed captioning stream 312 is also conceptually illustrated as part of the streaming media content event. The closed captioning stream 312 is typically a textual presentation of the words of the audio stream 306. The textual presentation is provided for hearing impaired viewers or for viewers in an area with relatively loud ambient noise levels, such as a bar or the like. The words of the closed captioning stream 312 are sequenced so as to generally correspond to the spoken words of the audio stream 306.

The serially sequenced video frames 310 may, in some formats, comprise different frame types, such as an I-frame (intra coded frame or slice), a P-frame (predicted frame of slice) and a B-frame (bi-directional predicted frame or slice), that are compressible to different degrees. The I-frame is the least compressible but does not require other video frames to decode. The P-frame may use data from previous I-frames to decompress and is more compressible than an I-frame. The B-frame can use both previous and forward video frames for data reference to get the highest amount of data compression. Other compression techniques may be used to compress the images of the video stream 304. As used herein, a complete video frame corresponds to a substantially complete set of data or information that may be used, by itself, to generate the video image 116. Accordingly, the complete video frame corresponds to the above-described I-frame. Complete video frames are indicated in FIG. 3 using shading (the complete video frames 310*a*, 310*b*, 310*c*). If other compression formats are used, such formats from time to time have a video frame that corresponds to a complete video frame.

To identify text in a selected video image 116, selected ones of the complete video frames from the video stream 304 are retrieved, selected or otherwise copied and communicated to the processor system 130 (FIGS. 1 and 2) for processing in accordance with the video frame OCR logic 134. The data or information in the processed complete video frame is used to generate the video image 116, wherein text of the video image 116 may be found therein.

Optical character recognition, usually abbreviated to OCR, is a mechanical or electronic translation of scanned images of handwritten, typewritten or printed text into machine-encoded text, referred to herein as the translated text. OCR is widely used to convert books and documents into electronic text-based files. OCR makes it possible to identify text in the video image 116 and/or in its corresponding image information. As used herein, the OCR module 216 may employ any suitable OCR algorithm, or its equivalent, to identify text in an video image 116.

Figure 4:
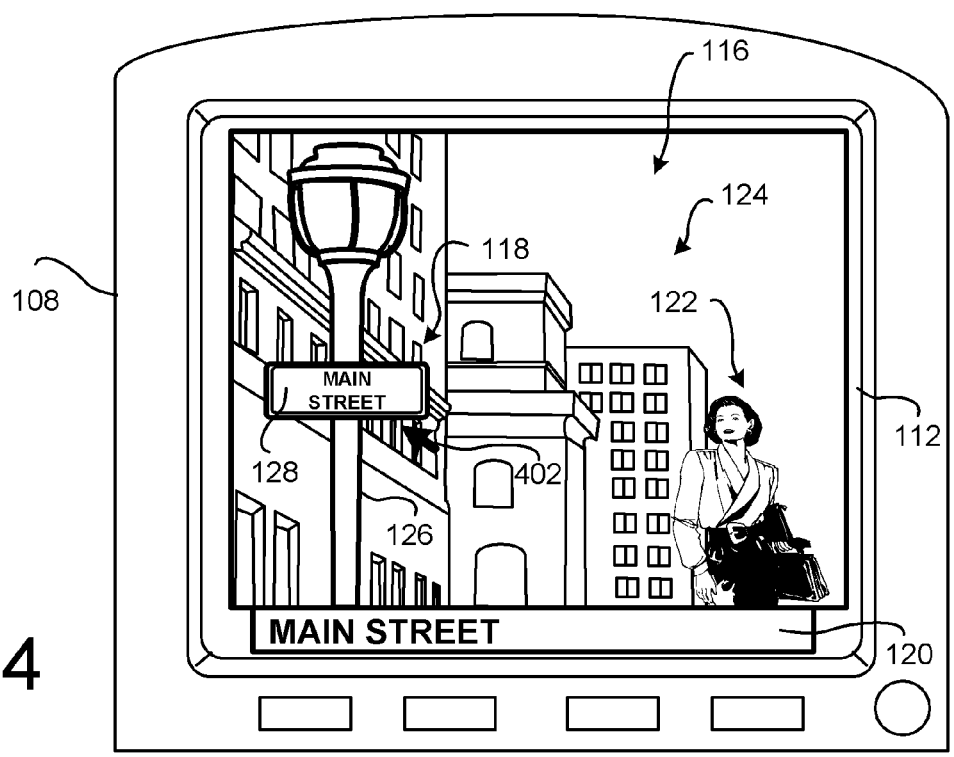
FIGS. 4 and 5 illustrate simplified examples of presented images indicating marked portions of the image having text of interest.
Figure 5:
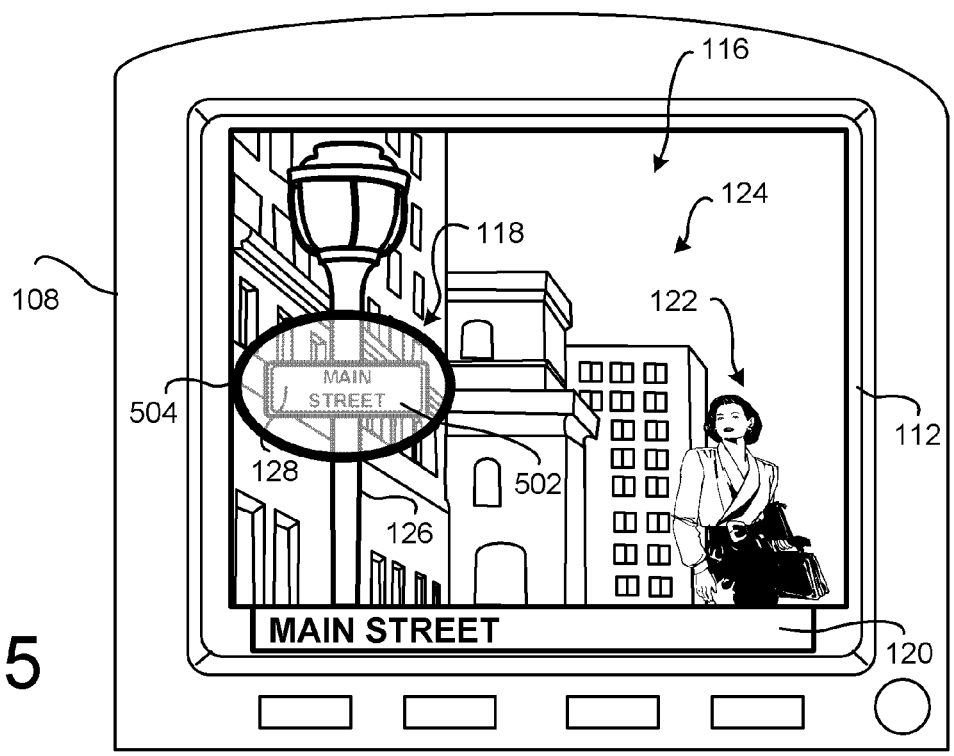

FIGS. 4 and 5 illustrate simplified examples of presented images 116 indicating marked portions of the video image 116 having text of interest. In FIG. 5, an example pointer icon 402 (illustrated as an arrow head) is shown at a point location overlaying the presented video image 116. That is, the pointer icon is presented in a location on the display 112 that is in proximity to the street sign 128 (with the text "Main Street" thereon that is affixed to the lamp post 126). The pointer icon 402 may indicate the location of the image portion 118 of the presented video image 116 having visible text thereon.

In an example embodiment, a predefined text search region that is located proximate to the pointer icon 402 is searched for text. If text is found by the OCR module 216 in the predefined text search region, then the OCR module 216 may be employed to translate the found text.

The predefined text search region may be any suitable region of the video image 116 that is presented on the display 112. The predefined text search region may have any suitable shape, such as a square, rectangle, circle or ellipse. In some embodiments, the size and/or shape of the text search region may be predefined by the user. Alternatively, or additionally, the size and/or shape of the text search region may be predefined by the program writer, by the vendor of the media device 102, and/or by another entity. The predefined text search region may be specified in terms relative to the size of the display. That is, the size of the predefined text search region will be larger when the video image 116 is presented on a large sized display 112, and will be smaller when the display 112 is smaller.

Proximity of the predefined text search region to the pointer icon 402 may be defined in a variety of manners. In an example embodiment, the location of the predefined text search region is centered about the location of the pointer icon 402. That is, the pointer icon 402 is presented at a point location on the display and overlays the presented video image, and wherein a location of the text search region on the presented video image is the same as the location of the pointer icon 402. Alternatively, or additionally, a selected point along a boundary edge of the predefined text search region may be located at, or close to, the pointer icon 402.

In the example embodiment illustrated in FIG. 4, the pointer icon 402 is presented as a directional arrow. The location of the predefined text search region is located in a position that is aligned with, or is generally aligned with, the current direction that the directional arrow pointer icon 402 is pointed. In an example embodiment, when the remote control 136 and/or the remote device 232 is operated to move the directional arrow pointer icon 402, the direction that the directional arrow pointer icon 402 is currently pointing is adjusted so as to be aligned in the same direction as the induced movement of the directional arrow pointer icon 402 as it is being moved about the display 112. Alternatively, the directional arrow pointer icon 402 may have a fixed orientation so that the user can understand where the location of the predefined text search region relative to the location of the directional arrow pointer icon 402.

In FIG. 5, an example pointer icon 502 (illustrated as a partially transparent region bounded by a boundary edge 504 shown as a relatively thick black line) is shown encompassing the street sign 128. The pointer icon 502 defines the text search region (that is, the image portion 118) of the presented video image 116 having visible text thereon. That is, the pointer icon 502 is presented at a region on the display and overlays the presented video image 116, and a location of the region of the text search region on the presented video image is the same as the location of the pointer icon 502.

The example embodiment pointer icon 502 may be of any suitable size and/or shape. In some embodiments, the size and/or shape of the pointer icon 502 may be predefined by the user. Alternatively, or additionally, the size and/or shape of the pointer icon 502 may be predefined by the program writer, by the vendor of the media device 102, and/or by another entity. The size of pointer icon 502 may be specified in terms relative to the size of the display. That is, the size of the predefined text search region will be larger when the video image 116 is presented on a large sized display 112, and will be smaller when the display 112 is smaller.

In an example embodiment, the user actuates one of the controllers 138 on the remote control 136 (FIG. 1) to cause presentation of the pointer icons 402, 502. The user may move (navigate) the location of the pointer icons 402, 502 by actuation of other controllers 138 on the remote control 136. For example, the up/down and right/left controllers may be operated, and the pointer icons 402, 502 may be adjusted thereby, similar to how the user uses the up/down and right/left controllers of the remote control 136 to navigate about a presented electronic program guide (EPG). The location of the pointer icons 402, 502 may be adjusted by a predetermined distance for each actuation of the up/down and right/left controllers. Alternatively, or additionally, the location of the pointer icons 402, 502 may be adjusted based upon the actuation duration for each actuation of the up/down and right/left controllers. For example, if the user actuates the up controller for one second, the location of the pointer icons 402, 502 may be adjusted by a corresponding distance. If the user actuates the up controller for a longer duration, the location of the pointer icons 402, 502 is adjusted further in the upward direction.

In embodiments where the remote device 232 emits a laser beam or the like, the user may "draw" the text search region defined by the pointer icon 502 into any desirable shape and/or size. For example, the user may actuate the remote device 232 to draw a loop or the like around the street sign 128. The drawn loop is then defined as to the boundary edge 504 of the text search region. Alternatively, or additionally, the user may operate the remote device 232 to draw a diagonal of a rectangle or a diameter of a circle or ellipse which then defines the text search region.

Once the location of the text search region indicated by the pointer icons 402, 502 has been defined, then the area bounded by the text search region is searched for text. If text is located in the predefined text search region, then the OCR module 216 is employed to identify the text.

In some embodiments, the interior portion of the text search region of the pointer icons 402, 502 is partially transparent so that the user can continue viewing the presented video portion of the media content event. Alternatively, the interior portion of the text search region may be transparent or may be solid. If shaded, the interior portion may be shaded using any pattern and/or color.

The control module 218 manages interpretation of input received by the remote control 136 and/or the remote device 232 such that the location of the text search region defined by the pointer icons 402, 502 is determined. When the user wants to use one of the pointer icons 402, 502 to indicate location of presented text that is of interest to the user, the user operates their remote control 136 or remote device 232 to transmit a wireless signal with a command to initiate presentation of the pointer icons 402, 502. In an example embodiment, initial presentation of the pointer icons 402, 502 is at a predefined location, such as in the center or the presented video image 116. Then, the user may move the location of the presented pointer icons 402, 502 to a location corresponding to the presented text of interest. In an example embodiment, the user operates their remote control 136 or remote device 232 to transmit a command that causes the video frame OCR logic 134 to find and translate the text of interest that is in the text search region associated with the location of the presented pointer icons 402, 502. In another embodiment, the video frame OCR logic 134 finds and translates the text of interest that is in the text search region associated with the location of the presented pointer icons 402, 502 when the repositioning of the pointer icons 402, 502 is finished. For example, if the pointer icons 402, 502 remain stationary for a second, or a few seconds, the video frame OCR logic 134 determines that the user has completed the positioning of the pointer icons 402, 502 to indicate the location of the text of interest.

The control module 218 further manages other characteristics of the text search region associated with the pointer icons 402, 502 to define the text search region of the presented video image 116 that is searched for text. For example, the size and/or shape of the text search region may be modified by the control module 218.

In some situations, the text search region defined by the pointer icons 402, 502 may not identify the entire location of the text of interest. That is, the text search region may encompass only a part of the text. For example, the text search region may encompass only a part of the street sign 128 such that a part of the text "main Street" is omitted from the text search region. Embodiments may be configured, in those situations, to search outside of the text search region defined to identify missing text that lies outside of the bounded region. In some embodiments, a dictionary database may be used to compare identified words of text to determine if one or more words are incomplete. If one or more of the words of the translated text are incomplete, the video text recognition system 100 would then search for the missing text that lies outside of the text search region defined by the pointer icons 402, 502.

Alternatively, or additionally, once the location of text within the text search region defined by the pointer icons 402, 502 is determined, some embodiments are configured to identify a degree of space margin between the boundary of the found text and the text search region defined by the pointer icons 402, 502. If an adequate degree of margin is identified, then the video text recognition system 100 may determine that all of the text of interest has been located. If the margin is inadequate in one or more places, then the video text recognition system 100 may determine that areas outside of the text search region should also be searched to identify the missing text that lies outside of the text search region defined by the pointer icons 402, 502.

In some embodiments, the entirety of the video frame associated with the presented video image 116 is searched for text. In such embodiments, when text is found in the video image 116, a determination is made whether to translate the text and then present the translated text to the user. In an example embodiment, a size characteristic of the found text is used to determine if the text should be translated. For example, if the height of a character of the found text exceeds a character height threshold, then the text is translated. If the character height of the found text is less than the character height threshold, then the text is not translated. The character height threshold may be a predefined distance, a font size, or the like.

Alternatively, or additionally, focus of the found text may be used to determine if the found text should be translated. For example, the focus of the found text is translated by the OCR algorithm only if the focus of the found text exceeds a focus threshold. The focus threshold may be a degree of blurriness, or a degree of clarity, of the found text. That is, if the found text is in focus (relative to a focus threshold), then the text is translated. If the found text is out of focus (relative to the focus threshold), then the text is not translated.

Alternatively, or additionally, orientation of the found text may be used to determine if the text should be translated. For example, the orientation of the found text is compared with an orientation threshold. The found text is translated by the OCR algorithm only if the orientation of the found text is less than the orientation threshold. The orientation threshold may be a predefined angle of orientation of the text relative to a horizon or other reference plane. That is, if the found text is oriented in a readable manner (relative to an orientation threshold), then the text is translated. If the found text is not oriented in a readable manner, such as if the presented found text is on its side or is upside down, then the text is not translated.

Metadata associated with the video frame may also be used to determine if the found text should be translated. For example, metadata describing the scene of the image of the video frame may indicate that the scene is presenting text on a letter, a computer screen, or other object. As another example, some media content events present messages intended to be read by the actors (and intended to be seen by the user) on a wall, mirror, or other object. Accordingly, the found text is translated and then is presented to the user.

Embodiments of the video text recognition system 100 may be configured to operate in different operating modes. When operating in a first example text translation mode of operation of the media device 102, the video text recognition system 100 automatically monitors the video stream 304 of the streaming media content event, and periodically processes a selected complete video frame to determine the presence of any text in the corresponding video image 116. Here, an image portion 118 has not been identified by a user. Accordingly, the entire area of the video image 116 is searched for text. If text is found, a determination is made whether the found text should be translated and then presented to the user. For example, characteristics of the found text (font size, focus, etc.) may be analyzed to determine if the found text should be translated. Alternatively, selected portions of the video image may be checked for text. For example, points along a grid, or areas corresponding to points along the grid, may be checked for text.

In another text translation mode of operation of the media device 102, complete video frames are periodically selected at a suitable predefined rate. For example, a complete video frame can be selected for processing every second, every few seconds, or even several times a second. The selection rate may be determined based in part upon the processing speed of the processor system 130, the amount of information in selected complete video frames, and/or an occurrence of other activities at the media device 102.

Additionally, the complete video frame selection rate may be dynamically adjustable to accommodate changing operating conditions. For example, the media device 102 may temporarily employ resources of the processor system 130 to access another device or perform another activity. Accordingly, the rate may be slowed to accommodate the other processes that are being performed. As another example, the amount of information in the complete video frames may increase, such as when a scene changes from a view of a body of water (where the amount of data in the corresponding complete video frame is relatively small) to a busy downtown street with fast moving automobiles (where the amount of data in the corresponding complete video frame is relatively large). Accordingly, when the amount of data in a complete video frame increases, the rate may be slowed to provide a sufficient amount of processing time to analyze the selected complete video frame.

Other information may be used to determine the rate and/or times that a complete video frame is selected for processing. In an example operating mode, scene descriptor information may be included in the metadata stream 308 which describes one or more scene characteristics. After the start of presentation of a new scene, as denoted by supplemental information in the metadata stream 308 which describes the new scene characteristics, a complete video frame may be selected for processing. If no text is found in the image associated with the selected complete video frame, then a new complete video frame may be selected upon the start of the next scene. Alternatively, or additionally, one or more later presented complete video frames may be selected for processing if the scene has a relatively long duration.

In another text translation mode of operation of the media device 102, the user provides a queuing signal or the like that actuates or prompts the video text recognition system 100 to select a complete video frame for processing. For example, the user may notice some text in a presented video image 116. The user may actuate one or more of the controllers 138 on their remote control 136 (or on the remote device 232). In response to receiving a signal from the remote control 136 (or the remote device 132), referred to herein as a prompting signal, the video text recognition system 100 selects a next received complete video frame. Alternatively, if a portion of the video stream 304 is available from the program buffer 204 and/or the DVR 206, a previously presented complete video frame may be selected for processing (since it is likely that some time has passed between the point at which the user first observed the presented text of interest and the time that the user was able to actuate the one or more controllers 138).

In another text translation mode of operation of the media device 102, the user provides an initial queuing signal or the like that actuates or prompts the video text recognition system 100 to pause presentation of the media content event. Then, the user is able to position one of the pointer icons, 302, 402, to a desired location in the presented video image 116 to specify a text search region. Then, the video text recognition system 100 selects the complete video frame corresponding to the paused video image 116 for processing.

In another text translation mode of operation of the media device 102, upon detection of text in periodically processed complete video frames, the video text recognition system 100 automatically pauses presentation of the media content event. Then, the user is able to position one of the pointer icons, 302, 402, to a desired location in the presented video image 116 to specify a text search region. Then, the video text recognition system 100 finds and translates the text, and then presents the translated text. In one mode, the automatic pause of the video image 116 is for a predefined duration. If no input is received from the user, then presentation of the media content event resumes. In another mode, a command from the user to process the complete video frame or to continue presentation is required to resume presentation of the media content event.

In the above automatic pause mode, the video text recognition system 100 refrains from subsequently pausing after presentation of the media content event resumes so as to avoid repeated distracting interruptions to the user. The video text recognition system 100 may refrain from again pausing for some predetermined duration, such as one minute or several minutes. When scene change information is available in the metadata stream 308, the video text recognition system 100 refrains from again pausing until a scene change occurs.

In another text translation mode of operation of the media device 102, where the complete video frames are periodically processed, the video text recognition system 100 compares currently translated text (or found text) with previously translated text (or found text). If the currently translated text (or found text) is the same as the previously translated text (or found text), then no action is taken. Thus, if the scene with the lamp post 126 and the lady 122 is panning across the city street, the movement of the street sign 128 across the field of view will not result in the interpretation by the video text recognition system 100 that different text has been found in a series of processed complete video frames.

In some situations, the found text may be handwritten text, such as might be found in a letter or note. Embodiments may be configured to recognize and interpret handwriting to translate the text shown in the presented video image 116.

In some instances, the media content event may be in a foreign language where the user is viewing the audio portion in subtitles presented using their native language. In such instances, the found text may be in a foreign language. In other instances, such as a media content event that is filmed in foreign countries, the found text may be in a foreign language (even though the audio portion of the media content event is presented in the native language of the user). Embodiments of the video text recognition system 100 may be configured to recognize foreign language text, and then interpret the found text into the native language of the user. In such embodiments, the video OCR logic includes a foreign language translation algorithm or module. Alternatively, foreign language text may be communicated over a backchannel link to the remote video text recognition device 228 or another remote device, wherein the foreign text is translated into the native language of the user, and is then returned to the media device 102 for presentation to the user.

In the various embodiments, the video text recognition system 100 is configured to permit user control of the size and/or format of presentation of the translated text. For example, the text banner is shown at the bottom area of the display 112. Alternatively, the text banner may be shown at the top of the display 112 or another location. The text banner 120 may be overlaid on top of the video image 116 (with or without some degree of transparency).

In some embodiments, the banner 120 and/or the text balloon 602 may be presented for a predefined duration, such as several seconds, to provide an adequate duration for the user to read the translated text. Alternatively, the banner 120 and/or the text balloon 602 may continue to be presented until a signal is received from the remote control 136 or the remote device 232.

In some situations, the amount of translated text exceeds an amount of text that can be presented in the banner 120 and/or the text balloon 602. In such situations, the translated text may be scrolled across the banner 120 and/or the text balloon 602 at a rate that permits the user to have sufficient time to read the scrolling translated text. In some embodiments, presentation of the banner 120 and/or the text balloon 602 ends upon conclusion of the presentation of the scrolling translated text. Alternatively, the banner 120 and/or the text balloon 602 may repeat the scrolling translated text until a signal is received from the remote control 136 or the remote device 232

Figure 6:
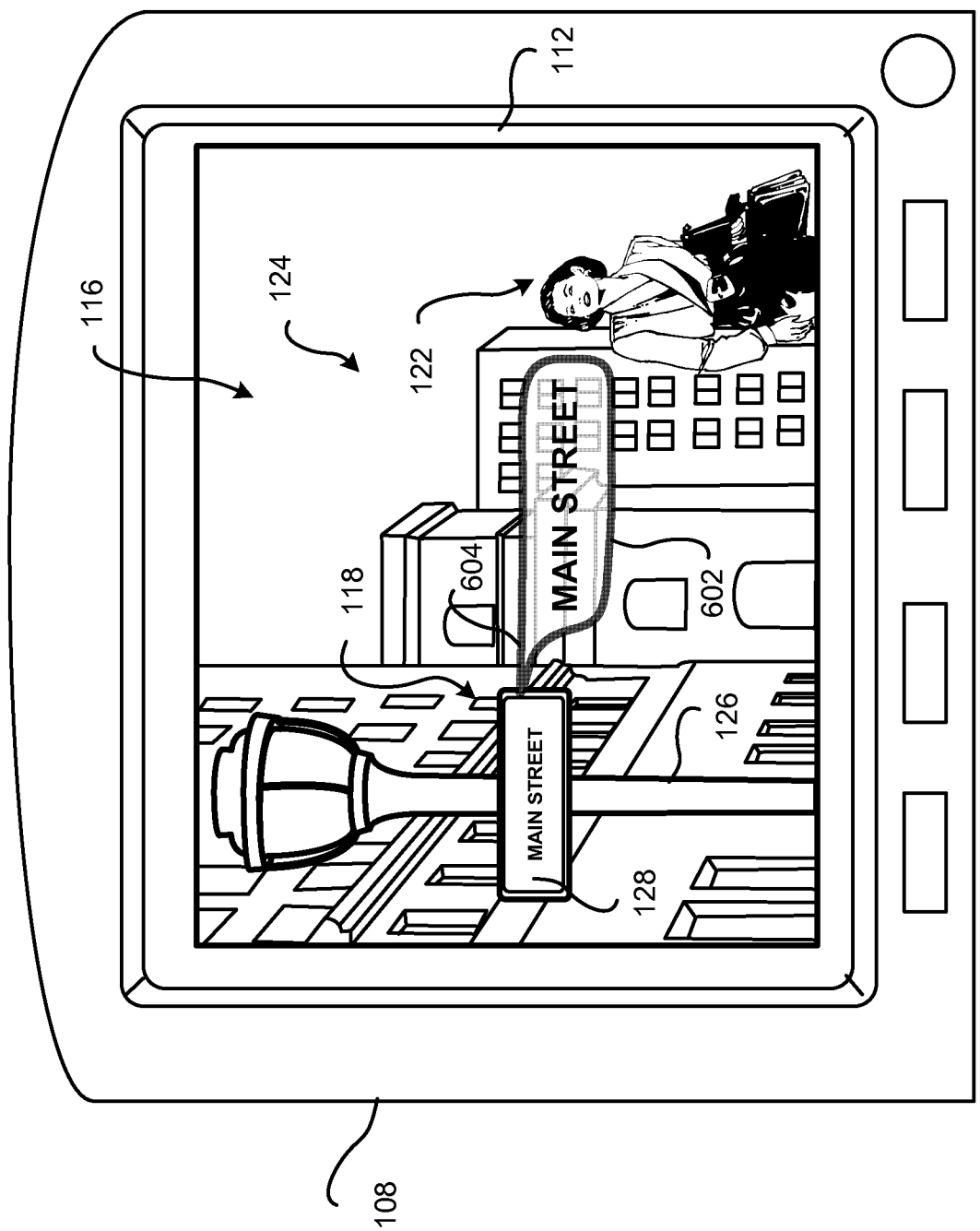
FIG. 6 illustrates presentation of the translated text using a text balloon.

In some embodiments, the translated text may be presented in other formats. FIG. 6 illustrates presentation of the translated text using a text balloon 602. The text balloon 602 includes a pointer portion 604 that points to the text search region where the found text was located. Accordingly, the user is able to better appreciate the origin of the translated text. Any suitable shape of a text balloon 602 may be used. Further, the text balloon 602 may have some degree of transparency, or may have a solid background of a suitable color, to facilitate viewing of the presented translated text by the user.

It should be emphasized that the above-described embodiments of the video text recognition system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of presenting text identified in a presented video image of a media content event, the method comprising:
receiving a complete video frame that is associated with a presented video image of a captured scene of a video content event, wherein the presented video image includes text disposed on an object that has been captured in the scene;
finding the text on the object that is part of the captured scene in the complete video frame;
using an optical character recognition (OCR) algorithm to translate the found text on the object into translated text; and
presenting the translated text associated with the text on the object that is part of the captured scene.

2. A method of presenting text identified in a presented video image of a media content event, the method comprising:
receiving a complete video frame that is associated with a presented video image of a captured scene of a video content event, wherein the presented video image includes text that has been captured in the scene;
finding the text in the complete video frame based on a text search region of the presented video image, wherein a location of the text search region is user specified based on a received signal from a remote control that initiates presentation of a pointer icon, wherein a location of the pointer icon defines a location of the text search region on the presented video image;
using an optical character recognition (OCR) algorithm to translate the found text and
presenting the translated text.

3. The method of claim 2, further comprising:
receiving a first signal from the remote control that initiates presentation of the pointer icon on a display that is concurrently presenting the presented video image, wherein the location of the pointer icon is associated with the location of the text search region on the presented video image; and
receiving a second signal from the remote control that adjusts the location of the pointer icon, wherein the adjusted location of the pointer icon adjusts the location of the text search region.

4. The method of claim 3, wherein the pointer icon is presented at a point location on the display and overlays the presented video image, and wherein the location of the text search region on the presented video image is centered about the location of the pointer icon.

5. The method of claim 3, wherein the pointer icon is presented at a region on the display and overlays the presented video image, and wherein a location of the region of the text search region on the presented video image is the same as the location of the pointer icon.

6. The method of claim 2, wherein the remote control that initiates presentation of the pointer icon is a laser-based pointer device, and further comprising:
receiving a signal from the laser-based pointer device that emits a laser beam, wherein a path of the laser beam over the presented video image identifies a boundary of the text search region.

7. The method of claim 2, wherein the remote control that initiates presentation of the pointer icon is a laser-based pointer device, and further comprising:
receiving a signal from the laser-based pointer device that emits a laser beam, wherein a point of the laser beam on the presented video image identifies the location of the text search region.

8. The method of claim 1, further comprising:
communicating the complete video frame from a media device to a remote device, wherein finding the text in the complete video frame and using the OCR algorithm to translate the found text occurs at the remote device; and
communicating the translated text from the remote device to the media device, wherein the media device presents the translated text.

9. The method of claim 1, wherein presenting the translated text comprises:
presenting the translated text on a display concurrently with the video image.

10. The method of claim 9, wherein presenting the translated text on the display comprises:
presenting the translated text in a banner that is presented on the display.

11. A method of presenting text identified in a presented video image of a media content event, the method comprising:
receiving a complete video frame that is associated with the presented video image of a captured scene of a video content event, wherein the presented video image includes text that has been captured in the scene;
finding the text in the complete video frame;
using an optical character recognition (OCR) algorithm to translate the found text and
presenting the translated text on a display concurrently with the video image in a text balloon on the display at a location that overlays the presented video image, wherein a pointer portion of the text balloon indicates a location of the found text in the presented video image.

12. The method of claim 1, wherein presenting the translated text comprises:
presenting the translated text as audible speech emitted from at least one speaker.

13. The method of claim 1, wherein the found text is in a first language, and further comprising:
translating the translated text from the first language to a second language, wherein the translated text is presented in the second language.

14. The method of claim 1, wherein finding the text in the complete video frame comprises:
determining a focus of the found text; and
comparing the focus of the found text with a focus threshold,
wherein the found text is translated by the OCR algorithm only if the focus of the found text exceeds the focus threshold.

15. The method of claim 1, wherein finding the text in the complete video frame comprises:
determining a character height of a character of the found text; and
comparing the character height of the character of the found text with a character height threshold,
wherein the found text is translated by the OCR algorithm only if the character height of the character exceeds the character height threshold.

16. The method of claim 1, wherein finding the text in the complete video frame comprises:
determining an orientation of the found text; and
comparing the orientation of the found text with an orientation threshold,
wherein the found text is translated by the OCR algorithm only if the orientation of the found text is less than the orientation threshold.

17. A media device, comprising:
a media content stream interface that receives a media content event comprising a stream of video frames that are serially presented, wherein each video frame includes a video image of an object that is part of a captured scene of the media content event, wherein the object that is part of the captured scene includes text thereon;
a presentation device interface that communicates the stream of video frames to a display of a media presentation device; and
a processor system communicatively coupled to the media content stream interface and the presentation device interface, wherein the processor system is configured to:
select a complete video frame from the received stream of video frames;
find the text on the object in the video image of the captured scene of the selected complete video frame;
translate the found text on the object using an optical character recognition (OCR) algorithm into translated text; and
communicate the translated text to the display via the presentation device interface,
wherein the translated text associated with the text on the object that is part of the captured scene is presented on the display.

18. A media device, comprising:
a media content stream interface that receives a media content event comprising stream of video frames that are serially presented, wherein each video frame includes a video image of a captured scene;
a presentation device interface that communicates the stream of video frames to a display of a media presentation device;
a remote interface that receives a signal from at least one of a remote control and a remote device; and
a processor system communicatively coupled to the media content stream interface, the remote interface and the presentation device interface, wherein the processor system is configured to:
select a complete video frame from the received stream of video frames;
initiate presentation of a pointer icon in response to receiving a first signal from the remote control or the remote device, wherein a location of the pointer icon is associated with a location of a text search region on the presented video image;
find text in the text search region of the video image of the selected complete video frame;
translate the found text using an optical character recognition (OCR) algorithm;
communicate the translated text to the display via the presentation device interface; and
adjust the location of the pointer icon in response to receiving a second signal from the remote control or the remote device, wherein the adjusted location of the pointer icon adjusts location of the text search region.

19. A method of operating a media device, the method comprising:
presenting a video image of a captured scene of a media content event, wherein the captured scene includes an object that is part of the captured scene, wherein the object has visible text thereon;
receiving an input that activates a text translation mode of operation of the media device;
selecting a complete video frame corresponding to the video image in response to activation of the text translation mode of operation;
finding the text on the object in the complete video frame based on a text search region of the presented video image, wherein the text search region encompasses at least part of the text;
using an optical character recognition (OCR) algorithm to translate the found text on the object into translated text; and
presenting the translated text associated with the text on the object that is part of the captured scene.

20. The method of claim 19, further comprising:
receiving a user input from a remote device; and
determining a location of the text search region of the presented video image based upon the user input.

* * * * *